Oct. 6, 1970  G. C. WOOD  3,531,927
ROTARY RAKING WHEEL TOOTH AND MOUNTING
Filed Aug. 9, 1968  2 Sheets-Sheet 1
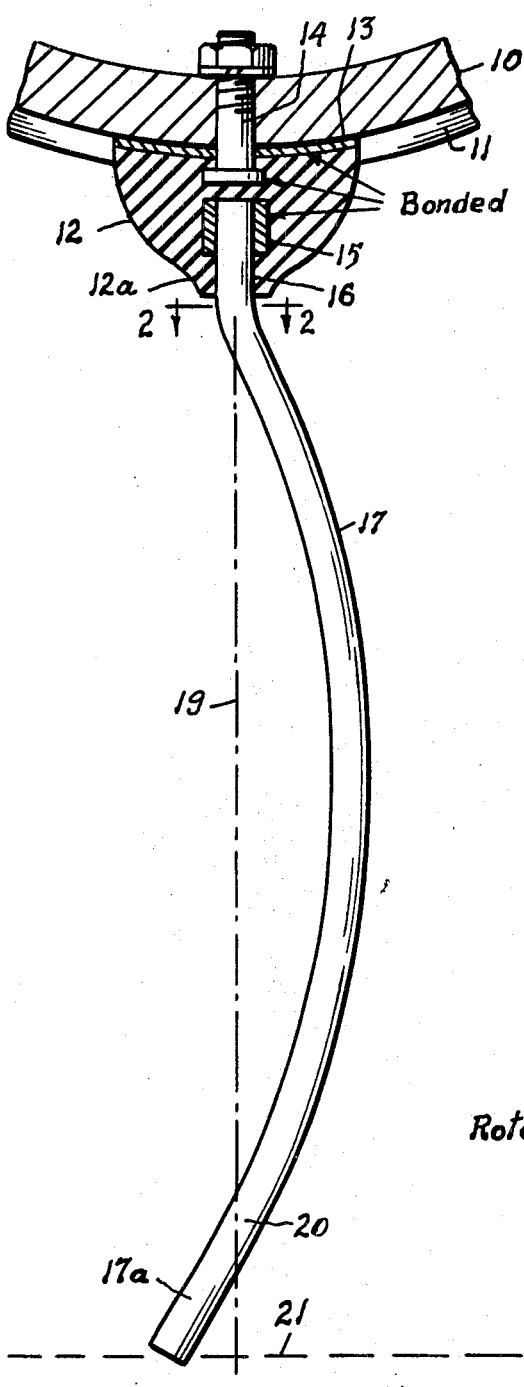
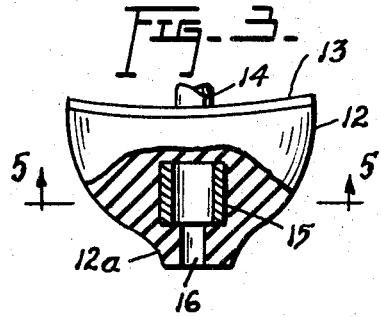
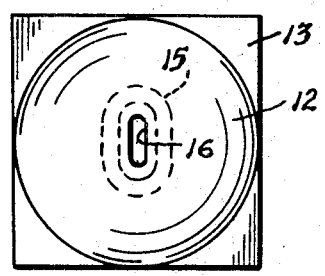
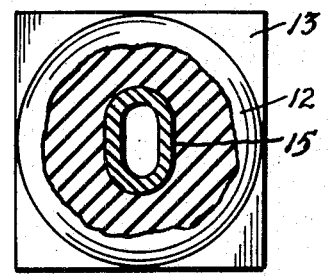
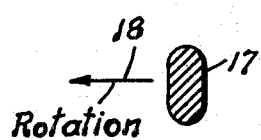
INVENTOR
George C. Wood
BY Munson H. Lane
ATTORNEY

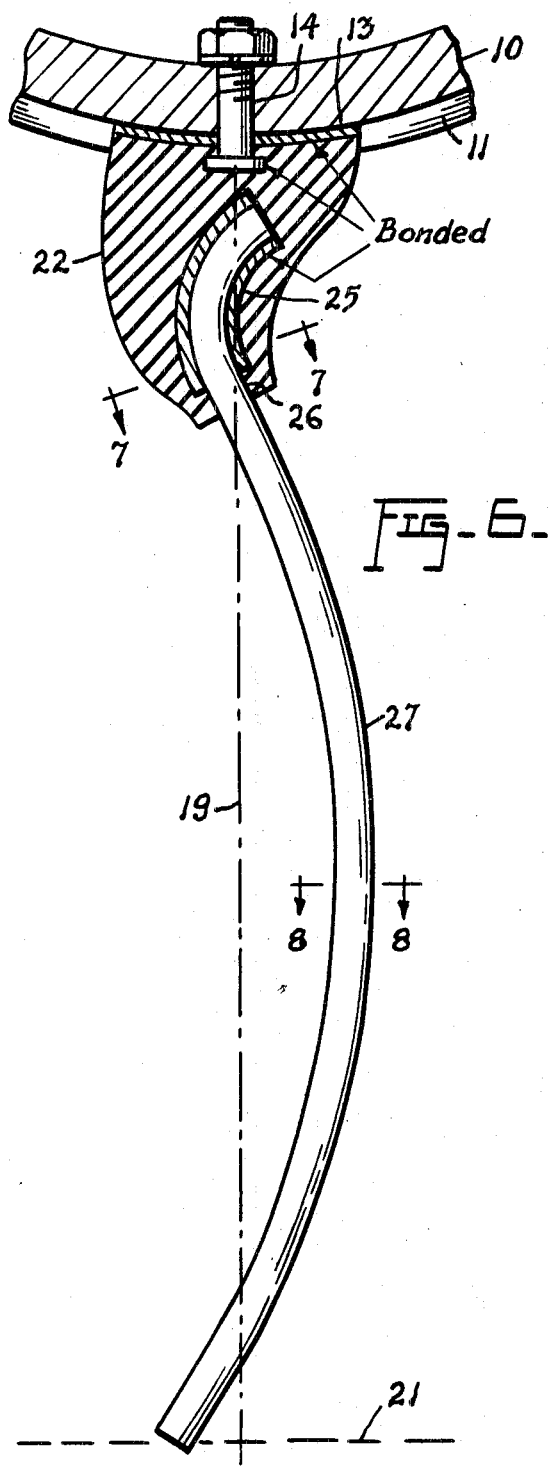
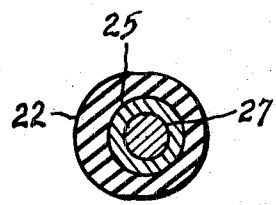

3,531,927
ROTARY RAKING WHEEL TOOTH
AND MOUNTING
George C. Wood, c/o Darf Corp., Edenton, N.C. 27932
Filed Aug. 9, 1968, Ser. No. 751,461
Int. Cl. A01d 71/00
U.S. Cl. 56—400          9 Claims

ABSTRACT OF THE DISCLOSURE

A resilient tooth mounting block secured to a wheel rim and having a hollow metallic socket embedded therein. The block is formed with an opening in register with but of a smaller size than the socket, and the end portion of a raking tooth is inserted in the socket through the opening so that a portion of the block surrounding the opening frictionally grips the tooth and holds it in place. A major portion of the tooth projecting outwardly from the socket and block is longitudinally curved. The tooth is prevented from turning in the socket either by a transversely elongated cross-section or by a longitudinal curvature of the socket and socketed tooth portion.

---

This invention relates to new and useful improvements in rotary raking wheels of the general type used on side delivery rakes or the like, and in particular the invention concerns itself with resiliently yieldable mounting of a raking tooth on the rim of the wheel, which mounting affords the tooth a certain amount of controlled movement so that it does not become bent, broken or otherwise damaged during the raking operation.

Although it is known in the art to provide resilient mounting of teeth on a raking wheel, as for example by a resilient block which is secured to the wheel rim and in which an end portion of the tooth is embedded, the principal object of the invention is to structurally and functionally improve upon such a conventional mounting arrangement in a manner which effectively holds the tooth in place, yet permits the tooth to be easily removed for replacement by another when so desired.

As such, an important feature of the invention resides in the provision of a resilient mounting block on the wheel rim, the block having embedded therein a tooth receiving socket and being provided with an opening in register with the socket, the parts being so proportionally dimensioned that when the tooth is inserted in the socket, a portion of the block around the opening frictionally grips the tooth and securely holds it in place.

Another important feature of the invention resides in providing a tooth which has a cross-section elongated in a direction transverse to the plane of wheel rotation, which not only increases the raking effectiveness of the tooth but also prevents the tooth from rotating or turning in the socket.

Another important feature of the invention resides in providing a tooth which, for most part, is longitudinally curved in a particular manner with respect to a radial line extending from the wheel rim, this serving to avoid direct axial thust of the tooth in the socket and facilitating more effective tooth deflection under the resilient control of the mounting block.

In a modified embodiment, another feature of the invention resides in providing the socket and the socketed tooth portion with a longitudinal curvature which prevents turning of the tooth in the socket but permits the use of a tooth of a circular cross-section.

Other objects, features and advantages of the invention will become apparent from the following description taken in conjunction with the accompanying drawings, wherein like characters of reference are used to designate like parts, and wherein:

FIG. 1 is a fragmentary vertical sectional view showing a portion of a wheel rim, a raking tooth and its mounting means in accordance with the invention;

FIG. 2 is a cross-sectional view of the tooth, taken substantially in the plane of the line 2—2 in FIG. 1;

FIG. 3 is a view, partly in elevation and partly in section, of the mounting block and socket with the tooth removed;

FIG. 4 is an underside plan view of the subject shown in FIG. 3;

FIG. 5 is a cross-sectional view, taken substantially in the plane of the line 5—5 of FIG. 3.

FIG. 6 is a view, similar to that shown in FIG. 1 but illustrating a modified embodiment of the invention;

FIG. 7 is a cross-sectional view, taken substantially in the plane of the line 7—7 in FIG. 6; and FIG. 8 is a view showing the cross-section of the tooth, as in the plane of the line 8—8 in FIG. 6.

Referring now to the accompanying drawings in detail and more particularly to FIGS. 1–5, the numeral 10 designates the rim portion of a raking wheel, the same being provided along its opposite side edges with a pair of flanges, one of which appears at 11. A tooth mounting block 12 of resiliently yieldable material such as hard rubber, synthetic, natural, or the like, is secured to the wheel rim, the block 12 preferably being bonded to a base plate 13 which seats against the rim 10 between the flanges 11 and is of a rectangular form as shown in FIG. 4 so that by its fitting between the flanges the plate 13 and the associated block 12 are prevented from turning about the axis of a mounting bolt assembly 14 which secures the block to the rim. In accordance with conventional practice, the head of the mounting bolt 14 is preferably embedded and bonded within the block 12, as will be apparent from FIG. 1.

The tooth mounting of the invention provides a metallic tooth receiving socket 15 which is also embedded and bonded within the block 12 as shown. The portion of the block 12 outwardly of the socket 15 preferably is somewhat tapered as indicated at 12a in the interests of greater resiliency, and this portion 12a is provided with an opening 16 which is in register with the interior of the socket 15. Significantly, the transverse dimension of the opening 16 is smaller than that of the interior of the socket 15 so that prior to installation of the raking tooth, the portion 12a of the block 12 surrounding the opening 16 projects laterally inwardly beyond the interior wall of the socket, as will be apparent from FIG. 3 and also from FIG 4.

The raking tooth 17 has a transverse dimension which substantially corresponds to that of the interior of the socket 15 and thus is greater than that of the opening 16. Consequently, when an end portion of the tooth 17 is inserted into the socket 15 through the opening 16 as illustrated in FIG. 1, the block portion 12a will be necessarily spread apart to enlarge the opening 16 for passage of the tooth therethrough and the inherent resiliency of the block will cause the block portion 12a to frictionally grip the tooth, thereby securely holding the same in the socket. Nevertheless, it will be apparent that the tooth may be easily removed for replacement by another when necessary, by simply pulling the tooth out of the socket 15 through the opening 16 which opening will then contract to its initial size until another tooth is inserted.

The socket 15, the opening 16 and the tooth 17 have a cross-section which is elongated in a direction transverse to the plane of rotation of the wheel, as indicated at 18 in FIG. 2. In other words, the tooth is flat-faced rather than round, with one of its flat faces oriented in the direction of rotation for a more efficient raking action. Moreover, the elongated cross-section of the tooth, opening and socket prevents the tooth from turning in the socket, thus assuring that the flat faces of the tooth are always transverse to the plane of wheel rotation, as aforesaid.

The major portion of the tooth 17 which projects outwardly from the block 12 is longitudinally curved in the plane of wheel rotation and is disposed or offset to one side of a radial line 19 extending outwardly from the rim 10 through the socket 15. At a point near its outer end, the curved tooth crosses the radial line 19 to the opposite side as indicated at 20 for engagement of its outer end region 17a with the ground indicated at 21.

By virtue of this particular tooth configuration with respect to the radial line 19, the tooth avoids exerting a direct axial thrust in the socket 15 and is capable of a more effective deflection in the plane of rotation of the wheel under the resilient control of the mounting block 12.

The longitudinal curvature of the tooth may extend through its outer end region 17a, although the latter may be straight, if so preferred. In any event, it is to be observed that the end region 17a is relatively short with regard to the overall length of the tooth, so that it contacts the ground 21 at a point close to the radial line 19.

Referring now to FIGS. 6–8, these show a modified embodiment of the invention which, for most part, is similar to that already described in connection with FIGS. 1–5, except that it utilizes a raking tooth 27 which is of a circular cross-section throughout its length. As such, the tooth 27 may conveniently be formed from round wire rod and does not require special shaping to provide the transversely elongated cross-section of the tooth 17.

Similarly, the tooth-receiving socket 25 in the resilient mounting block 22 is also of a circular cross-section, as is the mounting block opening 26 which communicates with the socket.

However, inasmuch as the round cross-section of these parts would ordinarily permit the tooth to turn or rotate in the socket, both the socket 25 and the end portion of the tooth which fits into the socket are longitudinally curved, as will be apparent from FIG. 6. By virtue of this longitudinal curvature the tooth is prevented from turning in the socket once it is inserted thereinto, such insertion being made by passing the curved end of the tooth through the opening 26 in the block 22 and then feeding the same inwardly while the curved end portion of the tooth follows the curvature of the socket to the ultimate, inserted position shown in FIG. 6. Necessarily, the tooth and the socket are curved to the same radius and their longitudinal curvature preferably spans an arc of approximately 90°, so that the arc of curvature crosses forwardly and then rearwardly of the aforementioned radial line 19, in opposition to the longitudinal curvature of the main body portion of the tooth which projects outwardly from the block 22.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a rotary raking wheel, the combination of a wheel rim, a tooth mounting block of resiliently yieldable material secured to said rim, a hollow metallic socket embedded in said block, said block being provided with a tooth receiving opening in register with but of a smaller transverse dimension than the interior of said socket, and a raking tooth having an end portion of substantially the same transverse dimension as the interior of the socket, said tooth end portion extending into said socket through said opening and a portion of said block surrounding the opening frictionally engaging the tooth end portion whereby to retain the tooth in position.

2. The device as defined in claim 1 wherein the cross-section of said socket, of said opening and of said tooth end portion is elongated to prevent turning of the tooth in the socket.

3. The device as defined in claim 2 wherein said tooth is of a uniform cross-section throughout its length.

4. The device as defined in claim 3 wherein the cross-section of said tooth is elongated in a direction transverse to the plane of rotation of said wheel rim.

5. The device as defined in claim 1 wherein a major portion of said tooth projecting outwardly from said block is longitudinally curved in the plane of rotation of said wheel rim.

6. The device as defined in claim 5 wherein said longitudinally curved portion of said tooth is offset to one side of a radial line extending from said wheel rim through said socket, the outer end region of said curved portion crossing said radial line to the relatively opposite side of the latter.

7. The device as defined in claim 1 wherein the cross-section of said socket, of said opening and of said tooth end portion is circular, said socket being elongated and longitudinally curved, and said tooth end portion also having a longitudinal curvature whereby to prevent turning of the tooth in the socket.

8. The device as defined in claim 7 wherein a major portion of said tooth projecting outwardly from said block is longitudinally curved in the plane of rotation of said wheel rim.

9. The device as defined in claim 8 wherein said longitudinally curved major portion of said tooth is offset to one side of a radial line extending from said wheel rim through said block, the longitudinal curvature of said socket and of the socketed tooth portion being offset to the opposite side of said radial line.

References Cited

UNITED STATES PATENTS 3,253,393    5/1966    Johnston     56—400
3,253,395    5/1966    Johnston et al.     56—400

ROBERT PESHOCK, Primary Examiner